(12) United States Patent
Midboe

(10) Patent No.: US 11,416,769 B2
(45) Date of Patent: *Aug. 16, 2022

(54) INTELLIGENT SERVICE REQUEST CLASSIFICATION AND ASSIGNMENT

(71) Applicant: Kyndryl, Inc., New York, NY (US)

(72) Inventor: Tyson R. Midboe, Saint Paul, MN (US)

(73) Assignee: KYNDRYL, INC., New York, NY (US)

(*) Notice: Subject to any disclaimer, the term of this patent is extended or adjusted under 35 U.S.C. 154(b) by 717 days.

This patent is subject to a terminal disclaimer.

(21) Appl. No.: 16/386,550

(22) Filed: Apr. 17, 2019

(65) Prior Publication Data

US 2019/0244134 A1 Aug. 8, 2019

Related U.S. Application Data

(63) Continuation of application No. 14/725,664, filed on May 29, 2015, now Pat. No. 10,360,512.

(51) Int. Cl.
| | |
|---|---|
| *G06N 3/08* | (2006.01) |
| *G06N 20/00* | (2019.01) |
| *H04L 67/63* | (2022.01) |
| *H04L 67/50* | (2022.01) |
| *G06N 7/00* | (2006.01) |
| *H04L 41/142* | (2022.01) |

(Continued)

(52) U.S. Cl.
CPC ........... *G06N 20/00* (2019.01); *H04L 67/535* (2022.05); *H04L 67/63* (2022.05); *G06N 3/08* (2013.01); *G06N 7/005* (2013.01); *H04L 41/142* (2013.01); *H04L 41/5045* (2013.01); *H04L 67/60* (2022.05)

(58) Field of Classification Search
None
See application file for complete search history.

(56) References Cited

U.S. PATENT DOCUMENTS

| | | | |
|---|---|---|---|
| 8,631,153 B2 | 1/2014 | Murthy et al. | |
| 10,360,512 B2 * | 7/2019 | Midboe | G06N 20/00 |

(Continued)

OTHER PUBLICATIONS

Raux, Flexible Turn-Taking for Spoken Dialogue Systems, Thesis Proposal, Carnegie Mellon University, 2006, pp. 1-83 (Year: 2006).*

(Continued)

*Primary Examiner* — Wilbert L Starks
(74) *Attorney, Agent, or Firm* — Ken Han; Hunter E. Webb; Keohane & D'Alessandro, PLLC (57) ABSTRACT

Approaches presented herein enable intelligent service request classification and assignment learning. More specifically, a request comprising a free form text or spoken description is received from a user. The request description is parsed and classified by a regression-based classifier. The regression-based classifier classifies based on, for example: the description itself; the requestor's history of requests, and/or supplemental demographics about a requestor. Optionally, a user may verify the classification or select from a plurality of returned classifications. A service provider or administrator confirms that a classification is correct. If not, the incorrectly classified request is queued. If so, the correctly classified request is added to a set of training data to be used in classifying future requests.

20 Claims, 4 Drawing Sheets

(51) Int. Cl.
   *H04L 41/5041* (2022.01)
   *H04L 67/60* (2022.01)

(56) References Cited

U.S. PATENT DOCUMENTS

2014/0136264 A1   5/2014   Kinsey, II
2015/0095080 A1   4/2015   Gatti et al.
2016/0350674 A1   12/2016  Midboe

OTHER PUBLICATIONS

Wilbert L. Starks, USPTO Office Action, U.S. Appl. No. 14/725,664, dated Sep. 5, 2017, 29 pages.
Wilbert L. Starks, USPTO Final Office Action, U.S. Appl. No. 14/725,664, dated Mar. 28, 2018, 11 pages.
Wilbert L. Starks, USPTO Office Action, U.S. Appl. No. 14/725,664, dated Aug. 28, 2018, 24 pages.
Wilbert L. Starks, USPTO Notice of Allowance and Fees Due, U.S. Appl. No. 14/725,664, dated Mar. 7, 2019, 10 pages.
Xinran He et al., "Practical Lessons from Predicting Clicks on Ads at Facebook", ADKDD '14, Aug. 24-27, 2014, New York, NY, Copyright 2014 ACM, 9 pages.
Dilek Hakkani-Tur et al., "An Active Approach to Spoken Language Processing", ACM Transactions on Speech and Language Processing, vol. 3, No. 3, Oct. 2006, pp. 1-31.
Antoine Raux, "Flexible Turn-Taking for Spoken Dialogue Systems", Copyright 2006, 83 pages.
Appendix P, "List of IBM Patents or Patent Applications Treated as Related", Mar. 13, 2020, 2 pages.

\* cited by examiner

INTELLIGENT SERVICE REQUEST CLASSIFICATION AND ASSIGNMENT

RELATED APPLICATION DATA

The present patent document is a continuation of U.S. patent application Ser. No. 14/725,664, filed May 29, 2015, entitled "INTELLIGENT SERVICE REQUEST CLASSIFICATION AND ASSIGNMENT", the disclosure of which is incorporated herein by reference.

TECHNICAL FIELD

This invention relates generally to service request classification in a customer support environment and, more specifically, to intelligent service request learning based on a single request input from a user.

BACKGROUND

In a typical system in which a user seeks assistance, such as a self-service web portal or Integrated Voice Response (IVR) system, a user is confronted with a plurality of menu options from which to choose in order to route the user to the sought after assistance. For example, if a user telephones a financial institution, the user may be presented with the following menu: "To hear your balance, press (1), to make a payment, press (2), to initiate a transfer, press (3)". Often, options in a menu may employ terminology that a user must interpret to navigate the menu. For example, following the scenario above, if a user selects option (3) above, "initiate a transfer", the user may further be confronted by the options: "To initiate a wire transfer, press (4), to initiate an ACH transfer, press (5)", which may confuse a user unfamiliar with financial terminology.

Even when a user takes time to navigate menu options, the user may nevertheless do so incorrectly. In this case, the user may wind up directed to a wrong queue, and end up talking to a person who cannot help the user or submitting a request to a system which cannot help the user. Furthermore, in some cases, menu options presented to a user do not match a problem a user is experiencing or a type of assistance a user would like. For example, following the scenario above, a user may wish to determine why a recent loan payment was not credited to a loan of the user, but there are not options in the menu above corresponding to such an inquiry. Accordingly, the user may resort to guessing which menu option to pick and fishing for how to make the inquiry.

SUMMARY

In general, embodiments described herein provide intelligent service request classification and assignment learning. More specifically, a request comprising a free form text or spoken description is received from a user. The request description is parsed and classified by a regression-based classifier. The regression-based classifier classifies based on, for example: the description itself; the requestor's history of requests, and/or supplemental demographics about a requestor. Optionally, a user may verify the classification or select from a plurality of returned classifications. A service provider or administrator confirms that a classification is correct. If not, the incorrectly classified request is queued. If so, the correctly classified request is added to a set of training data to be used in classifying future requests.

One aspect of the present invention includes a method for intelligent service request classification and assignment learning, comprising the steps of: receiving a single description of a service request from a user; applying to the service request description a logistic regression algorithm configured to determine a classification of the service request based on the description and a historic frequency of classified service requests submitted by the user; receiving a determination from a human administrator whether the service request is correctly classified; and continuously training the logistic regression algorithm against an increasingly refined set of training data of correctly classified service requests.

Another aspect of the present invention includes a computer system for intelligent service request classification and assignment learning, the computer system comprising: a memory device comprising program instructions; a bus coupled to the memory device; and a processor, for executing the program instructions, coupled to a request management tool via the bus that when executing the program instructions causes the system to: receive a single description of a service request from a user; apply to the service request description a logistic regression algorithm configured to determine a classification of the service request based on the description and a historic frequency of classified service requests submitted by the user; receive a determination from a human administrator whether the service request is correctly classified; and continuously train the logistic regression algorithm against an increasingly refined set of training data of correctly classified service requests.

Yet another aspect of the present invention includes a computer program product for intelligent service request classification and assignment learning, the computer program product comprising a computer readable storage device, and program instructions stored on the computer readable storage device, to receive a single description of a service request from a user; apply to the service request description a logistic regression algorithm configured to determine a classification of the service request based on the description, a historic frequency of classified service requests submitted by the user, and supplemental demographics about the user; receive a determination from a human administrator whether the service request is correctly classified; and continuously train the logistic regression algorithm against an increasingly refined set of training data of correctly classified service requests.

Yet still another aspect of the present invention includes a method for deploying a system for intelligent service request classification and assignment learning, comprising: providing a computer infrastructure that includes at least one computer device that operates to perform the steps of: receiving a single description of a service request from a user; applying to the service request description a logistic regression algorithm configured to determine a classification of the service request based on the description and a historic frequency of classified service requests submitted by the user; receiving a determination from a human administrator whether the service request is correctly classified; and continuously training the logistic regression algorithm against an increasingly refined set of training data of correctly classified service requests.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission, or viewing devices. The embodiments are not limited in this context.

As stated above, embodiments described herein provide intelligent service request classification and assignment learning. More specifically, a request comprising a free form text or spoken description is received from a user. The request description is parsed and classified by a regression-based classifier. The regression-based classifier classifies based on, for example: the description itself; the requestor's history of requests, and/or supplemental demographics about a requestor. Optionally, a user may verify the classification or select from a plurality of returned classifications. A service provider or administrator confirms that a classification is correct. If not, the incorrectly classified request is queued. If so, the correctly classified request is added to a set of training data to be used in classifying future requests.

In a typical self-service customer support system in which a user seeks assistance, such as a self-service web portal or Integrated Voice Response (IVR) system, a user may be confronted with a maze of menu options in order to direct the user to the sought after assistance. These options may be difficult to navigate due to, for example, confusing terminology, incorrect option selections, and/or a mismatch between assistance desired and available options. This can result in some users being placed in an incorrect queue, matched to an incorrect service person, or delayed in receiving service.

Accordingly, the approaches described herein contain numerous advantages over present methods including, but not limited to, classifying and routing a service request based on a single descriptive input from a user, classifying and routing a service request based on a frequency of requests and supplemental user data, applying a classification automatically based on a threshold, and applying historical feedback to enhance the classifying and routing.

Figure 1:
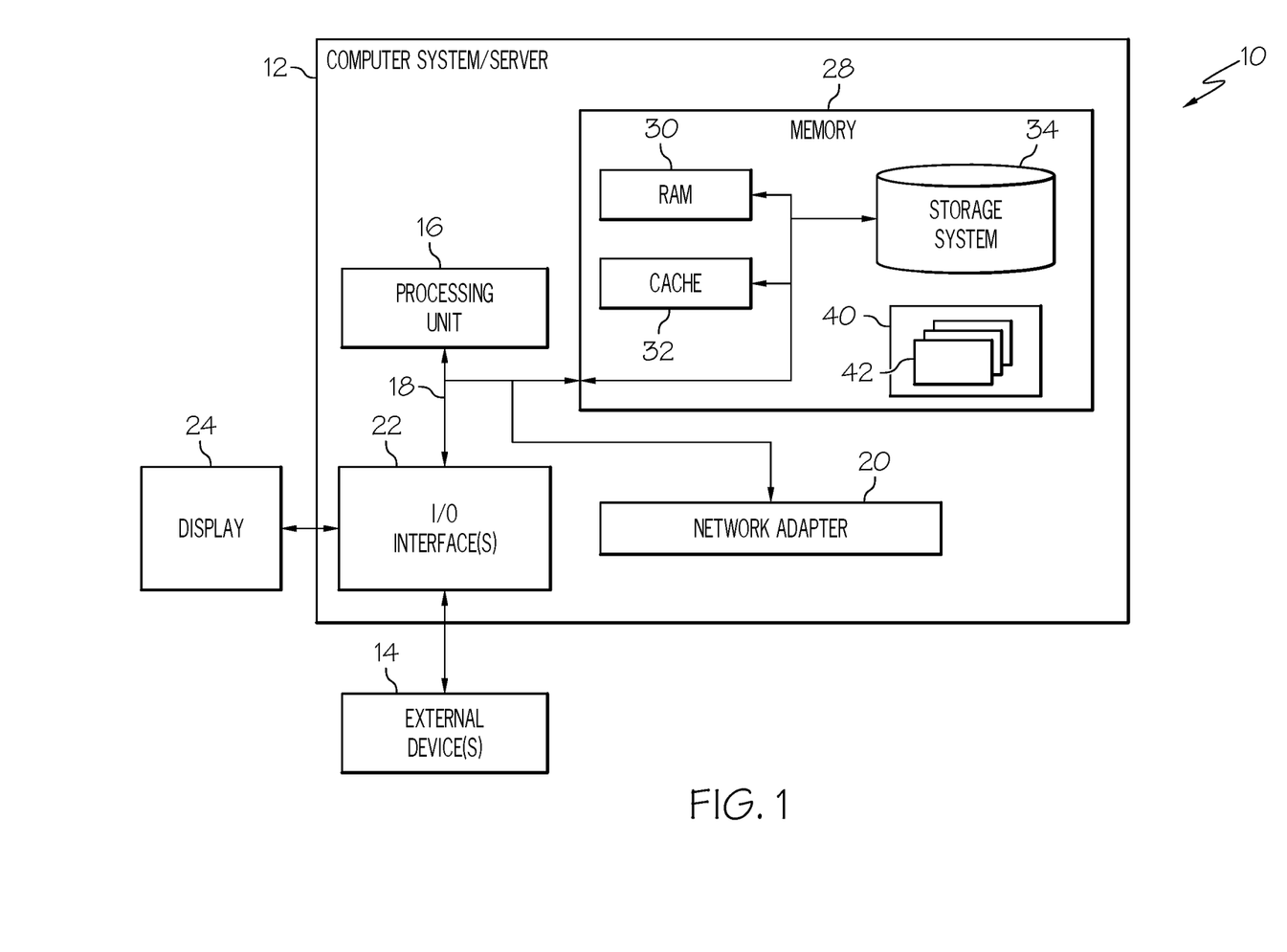
FIG. 1 shows an architecture in which embodiments of the invention may be implemented according to illustrative embodiments.

Referring now to FIG. 1, a computerized implementation 10 of an embodiment for intelligent service request classification and assignment learning will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the embodiment of the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 12 is intended to demonstrate that some or all of the components of implementation 10 could be deployed, managed, serviced, etc., by a service provider who offers to implement, deploy, and/or perform the functions of embodiments of the present invention for others.

Computer system 12 is intended to represent any type of computer system that may be implemented in deploying/realizing the teachings recited herein. Computer system 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system 12 represents an illustrative system for intelligent service request classification and assignment learning. It should be understood that any other computers implemented under embodiments of the present invention may have different components/software, but can perform similar functions.

Computer system 12 in computerized implementation 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for intelligent service request classification and assignment learning, which is stored in memory 28, storage system 34, and/or program/utility 40. While executing computer program code, processing unit 16 can read and/or write data to/from memory 28, storage system 34, and program/utility 40.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
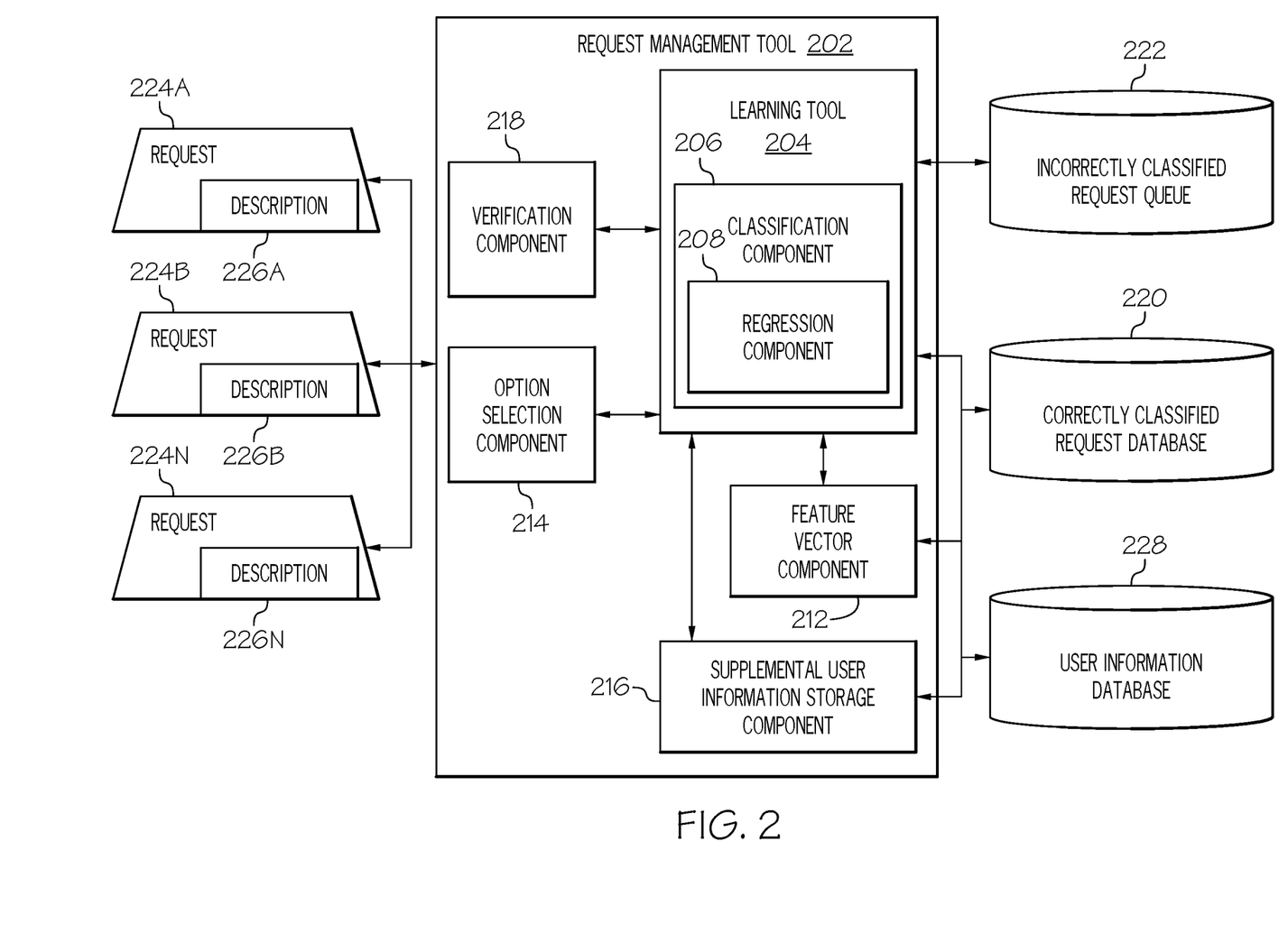
FIG. 2 shows a request management tool that may operate in the architecture shown in FIG. 1 according to illustrative embodiments.

Referring now to FIG. 2, request management tool 202, which receives, classifies, and stores service requests, will be described. As shown, request management tool 202 receives one or more service requests 224A-N, each of which comprises a description 226A-N of the service request. Service requests 224A-N and descriptions 226A-N may comprise any form of natural language input from a user including, but not limited to, a textual statement (e.g., a free form text), an auditory/spoken statement, or any combination thereof. Request management tool 202 may be configured to receive a variety of natural language inputs, varying in character, quality, detail, length, and so forth.

As shown in FIG. 2, request management tool 202 may comprise learning tool 204, which determines a classification of requests 224A-N based on descriptions 226A-N and user information or demographics, such as user history, undated in a feedback loop, as will be described in more detail further below. Learning tool 204 comprises classification component 206, which further comprises a regression component 208. In one embodiment, classification component 206 is configured to assign a classification to requests 224A-N based on a regression run by regression component 208 on descriptions 226A-N and demographics such as a user history. In one embodiment, classification component 206 may assign one or more classifications to a request 224A-N based on results of a regression by regression component 208. In some embodiments, learning tool 204 may be comprised within request management tool 202, while in other embodiments, learning tool 204 may operate outside of request management tool 202.

As shown in FIG. 2, request management tool 202 may comprise a vector component 212, which, in some embodiments, supplies a description 226A-N of request 224A-N to learning tool 204 as a feature vector (e.g., a parameter). In some embodiments, vector component 212 may be further configured to receive supplemental user information or demographics from user information database 228 and present supplemental user information to learning tool 204 as a feature vector (e.g., a parameter). For example, vector component 212 may provide learning tool 204 with a user's software entitlement level.

User information or demographics may comprise, for example, a user's history of service requests, including a frequency with which a user has selected various classifications in the past, and supplemental information about the user collected from internal and external systems, including, but not limited to, a Human Resources system (HR), a Configuration Management Database (CMDB), a Customer Relationship Management (CRM) system, an Enterprise Resource Planning (ERP) system, and various social media systems. In some embodiments, user information database 228 may be located internal to or external to request management tool 202 or learning tool 204. In some embodiments, user information database 228 may store the supplemental user information or demographics described above such as a user's history of service requests, including a frequency with which a user has selected various classifications in the past, and data about the user collected from internal and external systems. Supplemental user information or demographics may be gathered by supplemental user information storage component 216, which may, for example, register when a user requests a particular classification and relay such to user information database 228 to be tallied. Supplemental user information storage component 216 may further search internal and external systems for user information or demographics, such as that listed above, and relay such information to user information database 228 for storage. In some embodiments, supplemental user information storage component 216 may be a component of request management tool 202, a component of user information database 228, an independently functioning component.

Request management tool 202 further comprises option selection component 214. In one embodiment, in the event that classification component 206 determines, for example, two or more likely classifications, or a classification with a confidence level below a satisfactory threshold, for a request 224A-N, option selection component 214 may present a user with a selection of classification options. In another embodiment, option selection component 214 may verify an option or classification of a request selected by a user, regardless of whether a classification confidence is within tolerance.

Request management tool 202 further comprises verification component 218. In one embodiment, verification component 218 is configured to enable a human administrator to determine or verify that classification component 206 of learning tool 204 correctly classified a request 224A-N. In the event that the administrator determines a request 224A-N is correctly classified, request management tool 202 will record the request and user in correctly classified request database 220. Requests stored in correctly classified request database 220 are used as training data (e.g., to refine regression component 208) to correctly classify future requests. In the event that the administrator determines a request 224A-N is incorrectly classified, request management tool 202 will exclude the request and/or queue the request in incorrectly classified request queue 222 until the request can be correctly classified.

It can be appreciated that the approaches disclosed herein can be used within any computer system for intelligent service request classification and assignment leaning, as shown in FIG. 1. In this case, request management tool 202 and/or learning tool 204 can be provided, and one or more systems for performing the processes described in embodiments of the invention can be obtained and deployed to computer system 12. To this extent, the deployment can comprise one or more of: (1) installing program code on a computing device, such as a computer system, from a computer-readable medium; (2) adding one or more computing devices to the infrastructure; and (3) incorporating and/or modifying one or more existing systems of the computer system to enable the computer system to perform the process actions of embodiments of the invention. In some embodiments, request management tool 202 and/or learning tool 204 can be provided as a program modules 42 stored in memory 28 (FIG. 1). Any of correctly classified request database 220, incorrectly classified request queue 222, and user information database 228 may be provided as storage system 34, also stored in memory 28.

In some embodiments, it may be desirable to deploy management tool 202 and/or learning tool 204 and data storage systems locally to prevent time delays between a request by a user and a system response. However, embodiments of the present invention may also be deployed, for example, as a cloud-based predictive service or as any intermediary type of system.

Figure 3:
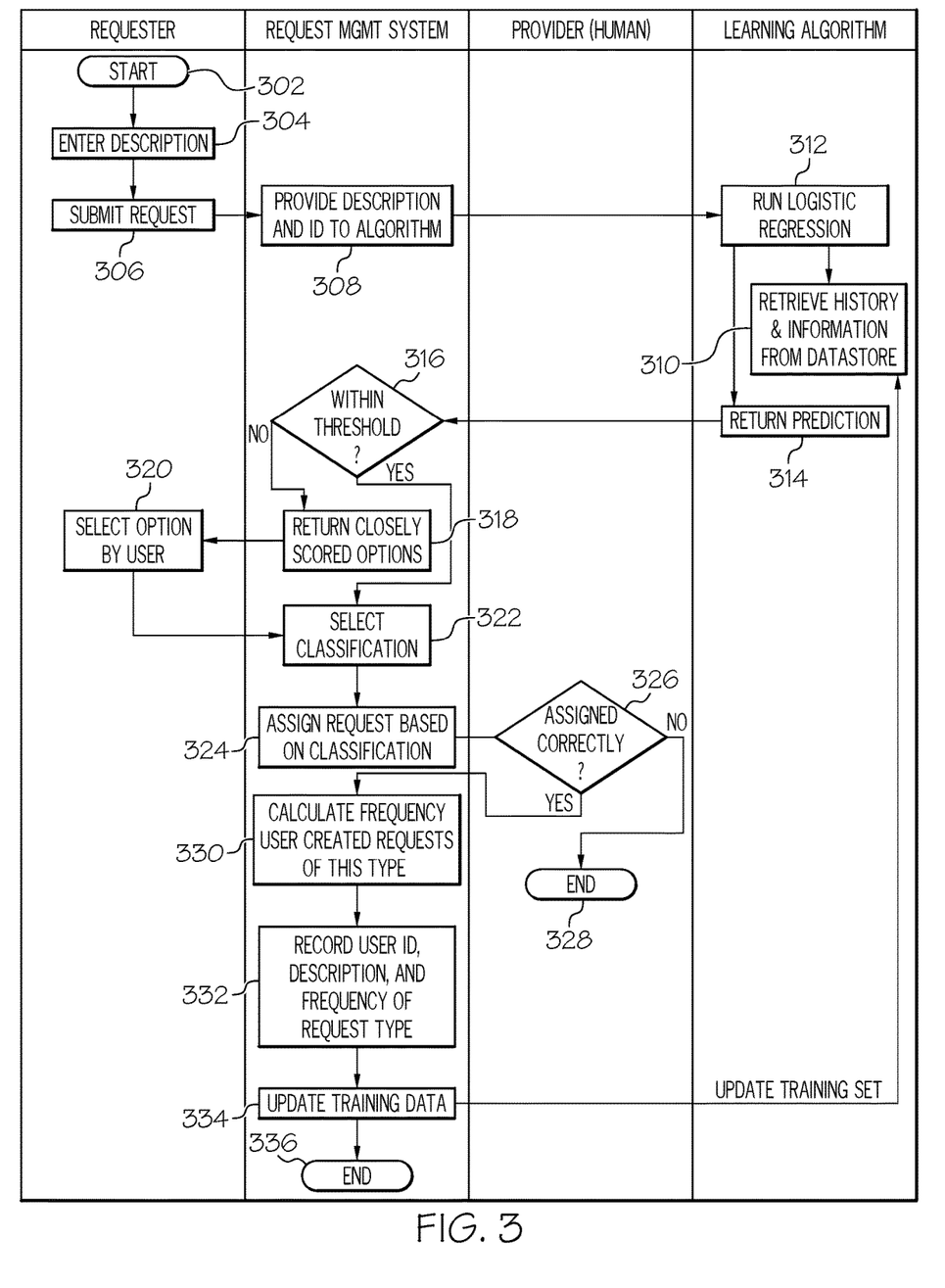
FIG. 3 shows a flow diagram of an approach for intelligent service request classification and assignment learning according to illustrative embodiments.

Referring now to FIG. 3, in connection with FIG. 2, a flow diagram of an approach for intelligent service request classification and assignment learning according to illustrative embodiments will be described. In the approach depicted in FIG. 3, a supervised machine learning algorithm is applied to a service request system which interprets a user's request. This supervised learning algorithm may be continuously trained against an increasingly refined list of correctly classified service requests. Accordingly, as a new request is submitted, the algorithm may predict a classification of the request based on a description of the request provided by a requesting user (i.e., the requester), as well as information already known about the requester. Correctly classified requests may be identified as such by a human operator and automatically added to subsequent training data sets to increase accuracy of predictions over time, while misclassified requests may be automatically excluded and/or queued until correctly classified. The classified requests are also routed to appropriate personnel, service queues, etc., which may be, for example, within large, complex organizations, based on a minimum of just one input from a requester. Via this identification of correctly classified requests by human operators, the system is calibrated and learns by example to accurately classify requests.

As shown in FIG. 3, in one embodiment, a process for intelligent service request classification and assignment learning begins at start 302. A user may describe a service request at step 304 to a service system. In a web-based service system, the description may, for example, be typed, entered, etc., into a freeform text box. In a phone-based service system, or other auditory system (e.g., an Integrated Voice Response (IVR) system), a user may speak into a receiver or microphone enabled computer device, and the speech of a user may be converted to text or any computer-readable language using any known voice-to-text algorithm.

At step 306, a user submits a service request comprising the description entered in step 304 to request management system/tool 202 (FIG. 2). The service request may be tagged with an identification of the requesting user and the identification of the submitting user may also be submitted with the service request to request management system/tool 202. In some embodiments, entered text or converted speech-to-text may be formatted as an HTML form and submitted to request management system/tool 202.

In an illustrative example, a user with ID "Joe12" calls an IT service desk and says, "I want help encrypting my computer's hard drive." According to one embodiment, the user's speech is converted to text and submitted to a request management system along with the user's ID "Joe12".

In an embodiment, at request management system/tool 202 (FIG. 2), the description of a request entered, spoken, etc., by a user at step 304 and an identification of the requesting user may be converted into one or more feature vectors (e.g., parameters) and provided at step 308 to a learning algorithm (e.g., embodied in regression component 208 of learning tool 204 of FIG. 2).

In further embodiments, based on the identification of the requesting user, information or demographics associated with the requesting user is retrieved by request management system/tool 202 at step 310 and provided to the learning algorithm. In some embodiments, this information associated with the requesting user may be converted into one or more feature vectors (e.g., parameters) and provided to the learning algorithm as such. As described above, information associated with the requesting user may comprise, for example, a user's history of service requests, including a frequency with which a user has selected various classifications in the past, and supplemental information about the user collected from internal and external systems, including, but not limited to: a human resources (HR) system (e.g., a user's role in an organization or business unit), a configuration management database (CMDB) (e.g., configuration items (CI) ownership), a Customer Relationship Management (CRM) system (e.g., software entitlements, service subscriptions), an Enterprise Resource Planning (ERP) system, and various social media systems. In some embodiments, some or all supplemental information may be stored in user information database 228 (FIG. 2), or externally in, for example, HR, CRM, ERP, social media, or other systems. A user's history of previously classified service requests (e.g., a frequency with which a user requested each of a plurality of services as classified by the learning algorithm) may be stored in correctly classified request database 220.

In an illustrative example, in the case of user Joe12's request described above, in response to user Joe12's submission above for help encrypting his hard drive, request management system/tool 202, via feature vector component 212 (FIG. 2), formats Joe12's request description as a feature vector, and submits it to a learning algorithm embodied in regression component 208 of learning tool 204. Using Joe 12's user ID, request management system/tool 202, via feature vector component 212, then further looks up Joe12's request history in correctly classified request database 220, formats the request history as a feature vector, and returns the same to the learning algorithm. The request management system/tool 202 may furthermore search for supplemental information about Joe12 based on his user ID, for example, stored in user information database 228, retrieve the same, and format the same as a feature vector and return the same to the learning algorithm.

At step 312, a logistic regression is run (e.g., by regression component 208 of learning tool 204 shown in FIG. 2) to determine a best classification (e.g., a personnel, service queue, help desk, etc., to which to direct a request) for the request. As described in part above, this regression is based on a description of a request provided by a user at step 304, and information known about the requesting user such as a request history of the requesting user (e.g., a frequency with which a user has selected various classifications in the past) and supplemental information about the user.

In one embodiment, the logistic regression may employ a naïve Bayes classifier to predict a classification of the request submitted by the user. In other words, in some embodiments, an algorithm used by regression component 208 may comprise one or more models that assign class labels to problem instances, represented as vectors of feature values, as described above, where the class labels are drawn from some finite set. In other embodiments, another classifier algorithm may be substituted in place of the naïve Bayes classifier if, for instance, another classifier algorithm better fits data available to request management system/tool 202. Accordingly, management system/tool 202 and regression component 208 are configurable and may be configured by a service provider, operator, or administrator, for example.

In any case, the logistic regression determines and returns a predicted best classification for the request at step 314. In some embodiments, the logistic regression may output several predictions, each of which is assigned a probability or confidence level (e.g., as a percent probability). In one embodiment, a best classification may be determined based on which classification is associated with a highest probability. A service provider, operator, or administrator may set a minimum tolerance or threshold (e.g., 90%) which a probability of a classification must be within in order for a classification to qualify as the best classification. In another embodiment, in the event that the logistic regression outputs several predictions, the predictions may be returned to a user to allow a selection between classification options (e.g., if two options are too close to call). These and other methods of verifying a classification prediction will be discussed in more detail below.

In an illustrative example, in the case of user Joe12's request described above, a logistic regression may receive Joe12's request for help encrypting a hard drive, along with a request history showing that Joe12 has seven previous calls that were classified to an IT security help desk and supplemental information indicating Joe12 has a subscription for security services. Accordingly, the logistic regression determines with a high confidence that Joe12's request should be classified as for the IT security help desk.

As discussed above, in one embodiment, a service provider, an operator, or an administrator may set a minimum tolerance or threshold for a probability of a classification of a request. In one embodiment, it is determined at step 316 whether a probability of a classification is within a threshold (e.g., 90%). Classification options scoring close to the threshold or having the highest scores may be returned to a user at 318 if, for example, no classification has a probability at or over the tolerance, or if several possible classifications are predicted (e.g., if two or more classifications are identified with close probability scores), or if an administrator configures request management system 202 (FIG. 2) to verify a classification with a user before proceeding. In the event that classification options are returned to the user (e.g., as a list), for example by option selection component 214 (FIG. 2), a user may select from the options the classification which best fits the service request of the user at step 320. At step 322, this classification selected by the user is entered for the request in the request management system 202. Accordingly, an administrator may control the likelihood of a request being automatically assigned a classification or a classification being verified by a user by setting probability thresholds.

In the alternative, in the event that the probability of the classification of a request meets or exceeds the threshold, in some embodiments, the classification is automatically selected for the request at step 322, without any further action by a user.

In an illustrative example, in the case of user Joe12's request described above, because the logistic regression determines with a high confidence that Joe12's request should be classified as for the IT security help desk, the request is automatically classified as "IT Security Help Desk", without asking user Joe12 to again clarify what service he would like.

In any case, at step 324, the request is assigned to an appropriate team, service personnel, service area, etc. based on the classification selected at step 322. In some embodiments, the request may be forwarded immediately to the team, service personnel, service area, etc. In still other embodiments, the request is first verified by a provider or administrator at step 326, as discussed below, before being forwarded. In still yet other embodiments, a member of the team identified by the classification serves as a provider/administrator to determine if the request has been classified correctly.

In any case, at step 326 a human provider, operator, or administrator determines or verifies if a request is correctly classified, for example, by verification component 218 (FIG. 2). In some embodiments, any administrator or service team can act as the provider to determine whether the request is assigned correctly. In the event that a request is incorrectly classified, as indicated by either a requesting user or by the provider, the request is automatically excluded from future training data. The request may be queued (e.g., in incorrectly classified request queue 222), until such time as the request may be correctly reclassified, at which point the request may be added to the training set, as described further below. This process increases the accuracy of predictions over time, as well as adapts request management system/tool 202 (FIG. 2) to changes in a provider's service portfolio. In any case, if a request is indicated as being incorrectly identified, a classification process with respect to that request may end or be placed on hold at step 328.

In one embodiment, in the event that a request is correctly classified, as indicated by a requesting user and/or by a provider at step 326, the request may be routed to an appropriate team, service personnel, service area, etc., as designated by the classification. In another embodiment, in the event that the team, service personnel, service area, etc., as designated by the classification, fulfills the service request without reassigning the request, the request is indicated as correctly assigned at step 326.

In an illustrative example, in the case of user Joe12's request described above, a system administrator or personnel at the IT security help desk may review Joe12's request to verify that it belongs at the IT security help desk. The administrator may determine that the request would more appropriately be classified in the "Encryption Help Desk". Accordingly, the administrator would mark the request as incorrectly classified, and optionally manually send the request to the correct service center while maintaining a copy of the request in a queue for future practice.

In any case, if a request is correctly identified, a frequency a user creates requests of a particular service (classification) is calculated at step 330. In one embodiment, a simple counter may be updated. At step 332, a user's identification, and one or more of the service request description, the classification of the request, and the calculated frequency of a particular service type are recorded as metrics (e.g., in correctly classified request database 220 (FIG. 2)). The classification of the request and the requester metrics may, in one embodiment, be tallied in correctly classified request database 220 to achieve a frequency with which a user submits requests for a particular classification.

These metrics are used to update an increasingly refined list of correctly classified service requests at step 334, which is used as a set of training data. This training data may be used to continuously train a learning classification algorithm embodied in regression component 208 of learning tool 204. Metrics on a frequency with which a user submits requests for a particular classification may also be employed, as described above, to predict likely classification of a particular user's service request. Because the process described herein uses feedback from end users and providers/administrators to automatically and continuously update the training data, request management system/tool 202 (FIG. 2) is capable of producing highly accurate results over time, as well as adapting to changes in an organization's service portfolio.

In an illustrative example, in the case of user Joe12's request described above, assuming the request was correctly sent to the IT security help desk, Joe12's user identification, the IT security help desk classification, and a number of times he has used the IT security help desk (updated from 7 to 8) are recorded in correctly classified request database 220. The next time Joe 12 submits a service request, this data will be retrieved and considered in determining what classification of service Joe12 has most likely requested.

Once metrics on the request have been recorded and the request serviced, the process ends at step 336. It should also be noted that, in some alternative embodiments, the process noted in the flow diagram of FIG. 3 might occur out of the order depicted. For example, two blocks shown in succession may, in fact, occur substantially concurrently or in a reverse order.

Figure 4:
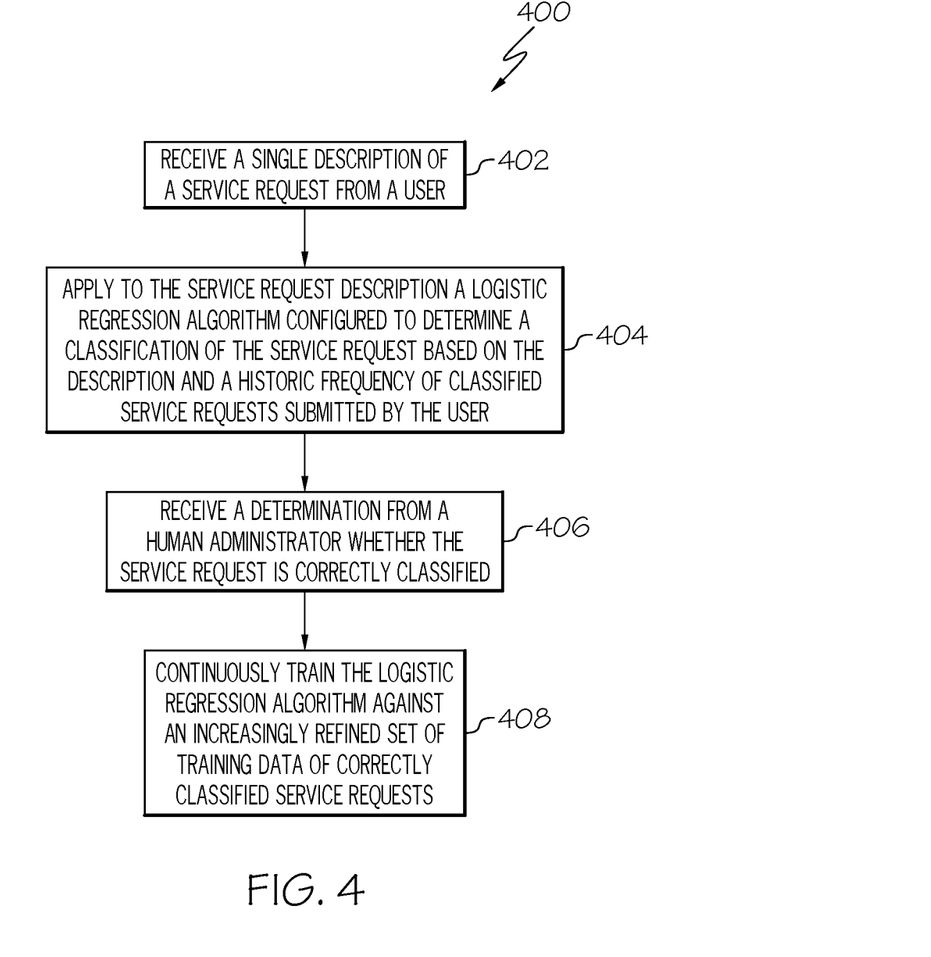
FIG. 4 shows a process flowchart for intelligent service request classification and assignment learning according to illustrative embodiments.

As depicted in FIG. 4, a system (e.g., computer system 12) carries out the methodologies disclosed herein. Shown is a process flowchart 400 for intelligent service request classification and assignment leaning. At step 402, a single description of a service request is received from a user. At step 404, a logistic regression algorithm configured to determine a classification of the service request based on the description and a historic frequency of classified service requests submitted by the user is applied to the service request description. At step 406, a determination from a human administrator whether the service request is correctly classified is received. At step 408, the logistic regression algorithm is continuously trained against an increasingly refined set of training data of correctly classified service requests.

Process flowchart 400 of FIG. 4 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for intelligent service request classification and assignment learning. Thus, embodiments herein disclose a process for supporting computer infrastructure, comprising integrating, hosting, maintaining, and deploying computer-readable code into a computing system (e.g., computer system 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for intelligent service request classification and assignment learning. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

Embodiments of the present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided herein approaches to intelligent service request classification and assignment learning. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method of intelligent service request classification and assignment learning, comprising:
   receiving, at an automated user assistance system, a single description of a service request that is freeform in a natural language from a user;
   converting the description and an identification of the user into a set of feature vectors;
   applying to the service request description a logistic regression algorithm configured to determine a classification of the service request based on the description and a historic frequency of classified service requests submitted by the user in the set of feature vectors;
   forwarding the service request to a human administrator based on the classification;
   receiving a determination from the human administrator whether the service request is correctly classified; and
   continuously training the logistic regression algorithm against an increasingly refined set of training data of correctly classified service requests.

2. The method of claim 1, wherein the logistic regression algorithm is a nave Bayes classifier.

3. The method of claim 1, where, in the case that the service request is correctly classified, the method further comprises storing an identification of the user and a classification of the service request in the set of training data.

4. The method of claim 3, further comprising:
   calculating a frequency the user requests a service of the classification; and
   storing the frequency in the set of training data.

5. The method of claim 1, further comprising:
predicting a probability a classification determined with the logistic regression algorithm applies to the service request; and
in the case that the probability is within a threshold, assigning the classification to the service request automatically.

6. The method of claim 5, where, in the case that the probability is under a threshold, the method further comprises:
returning a set of one or more classification options to the user; and
assigning a classification option selected by the user to the service request.

7. The method of claim 1, wherein the logistic regression algorithm is further configured to determine a classification of the service request based on supplemental demographics about the user, the supplemental demographics being collected from one or more of: a human resources (HR) system, a configuration management database (CMDB), a Customer Relationship Management (CRM) system, an Enterprise Resource Planning (ERP) system, and a social media system.

8. A computer system for intelligent service request classification and assignment learning, the computer system comprising:
a memory device comprising program instructions;
a bus coupled to the memory device; and
a processor, for executing the program instructions, coupled to a request management tool via the bus that when executing the program instructions causes the system to:
receive, at an automated user assistance system, a single description of a service request that is freeform in a natural language from a user;
converting the description and an identification of the user into a set of feature vectors;
apply to the service request description a logistic regression algorithm configured to determine a classification of the service request based on the description and a historic frequency of classified service requests submitted by the user in the set of feature vectors;
forward the service request to a human administrator based on the classification;
receive a determination from the human administrator whether the service request is correctly classified; and
continuously train the logistic regression algorithm against an increasingly refined set of training data of correctly classified service requests.

9. The system of claim 8, wherein the logistic regression algorithm is a nave Bayes classifier.

10. The system of claim 8, where, in the case that the service request is correctly classified, the program instructions further cause the system to store an identification of the user and a classification of the service request in the set of training data.

11. The system of claim 10, the program instructions further causing the system to:
calculate a frequency the user requests a service of the classification; and
store the frequency in the set of training data.

12. The system of claim 8, the program instructions further causing the system to:
predict a probability a classification determined with the logistic regression algorithm applies to the service request; and
in the case that the probability is within a threshold, assign the classification to the service request automatically.

13. The system of claim 12, where, in the case that the probability is under a threshold, the program instructions further cause the system to:
return a set of one or more classification options to the user; and
assign a classification option selected by the user to the service request.

14. The system of claim 8, wherein the logistic regression algorithm is further configured to determine a classification of the service request based on supplemental demographics about the user, the supplemental demographics being collected from one or more of: a human resources (HR) system, a configuration management database (CMDB), a Customer Relationship Management (CRM) system, an Enterprise Resource Planning (ERP) system, and a social media system.

15. A computer program product for intelligent service request classification and assignment learning, the computer program product comprising a computer readable storage device, and program instructions stored on the computer readable storage device, to
receive, at an automated user assistance system, a single description of a service request that is freeform in a natural language from a user;
convert the description and an identification of the user into a set of feature vectors;
apply to the service request description a logistic regression algorithm configured to determine a classification of the service request based on the description, a historic frequency of classified service requests submitted by the user, and supplemental demographics about the user in the set of feature vectors;
forward the service request to a human administrator based on the classification;
receive a determination from the human administrator whether the service request is correctly classified; and
continuously train the logistic regression algorithm against an increasingly refined set of training data of correctly classified service requests.

16. The computer program product of claim 15, wherein the logistic regression algorithm is a native Bayes classifier.

17. The computer program product of claim 15, where, in the case that the service request is correctly classified, the program instructions are further configured to store an identification of the user and a classification of the service request in the set of training data.

18. The computer program product of claim 17, the program instructions being further configured to:
calculate a frequency the user requests a service of the classification; and
store the frequency in the set of training data.

19. The computer program product of claim 15, the program instructions being further configured to:
predict a probability a classification determined with the logistic regression algorithm applies to the service request; and
in the case that the probability is within a threshold, assign the classification to the service request automatically.

20. The computer program product of claim 19, where, in the case that the probability is under a threshold, the program instructions are further configured to:

return a set of one or more classification options to the user; and assign a classification option selected by the user to the service request.

* * * * *